United States Patent

[11] 3,577,824

[72] Inventor Lawrence P. Lavan
 245 E. 72nd St., New York, N.Y. 10006
[21] Appl. No. 824,111
[22] Filed May 13, 1969
[45] Patented May 4, 1971

[54] MUSIC TEACHING MACHINE
 7 Claims, 5 Drawing Figs.
[52] U.S. Cl. .................................................. 84/478,
 84/470
[51] Int. Cl. .............................................. G09b 15/02
[50] Field of Search ......................................... 84/470,
 477, 478

[56] References Cited
UNITED STATES PATENTS
3,026,634 3/1962 Irazoqui ..................... 84/470
3,331,271 7/1967 Glenn ......................... 84/478
3,446,109 5/1969 Scott et al. .................. 84/478
3,456,546 7/1969 Welsh et al. ................. 84/478
3,482,480 12/1969 Decker ........................ 84/470

Primary Examiner—Richard B. Wilkinson
Assistant Examiner—Lawrence R. Franklin
Attorneys—Harry C. Bierman, Jordan B. Bierman and Bierman and Bierman ABSTRACT: A music teaching machine produces small lighted areas on a screen having musical notations in response to depressions of the keys of an associated musical instrument. The lights are color coded and physically positioned to indicate the sets of notes constituting major thirds and minor thirds. A movie picture projector, lens system, and a mirror are arranged to project notes, to be played, on the same screen.

Patented May 4, 1971
3,577,824
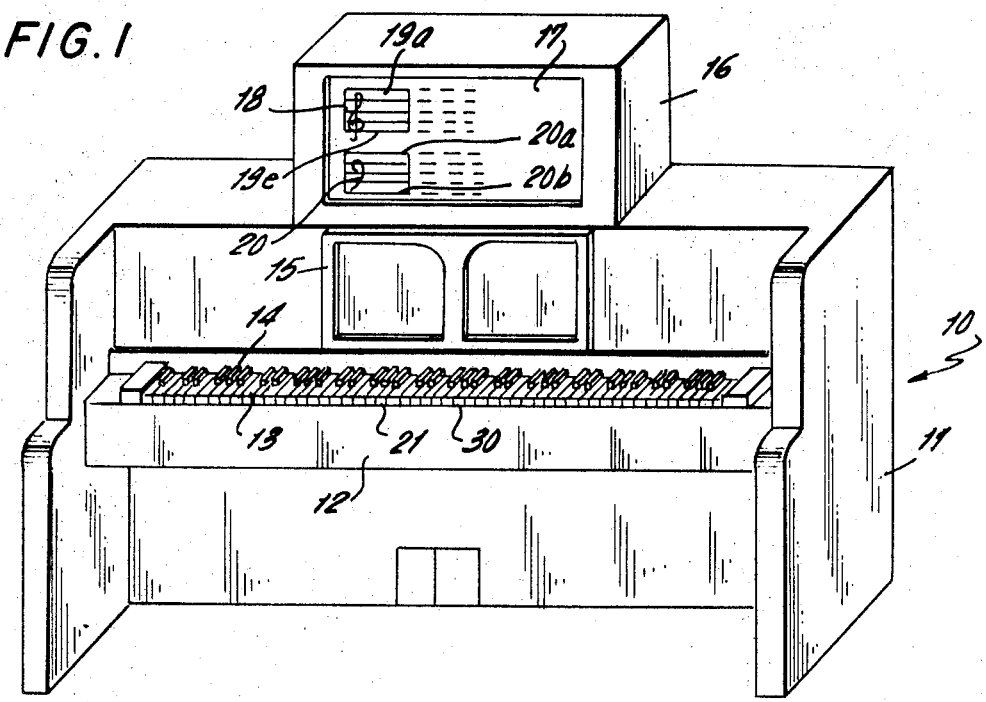
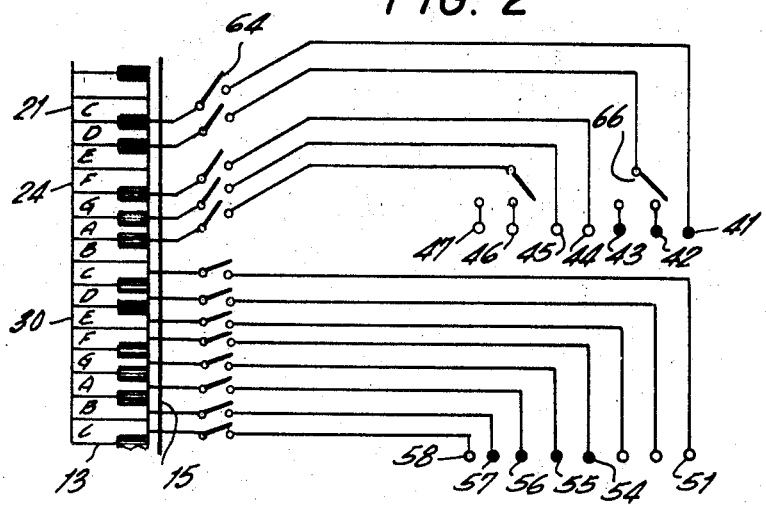
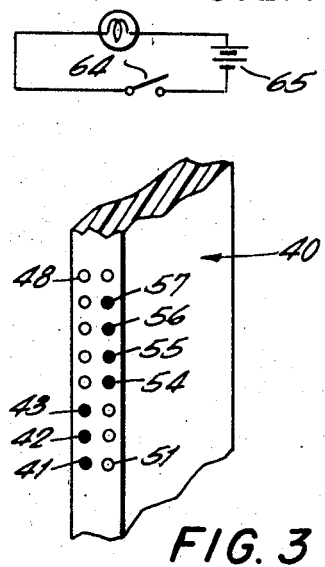
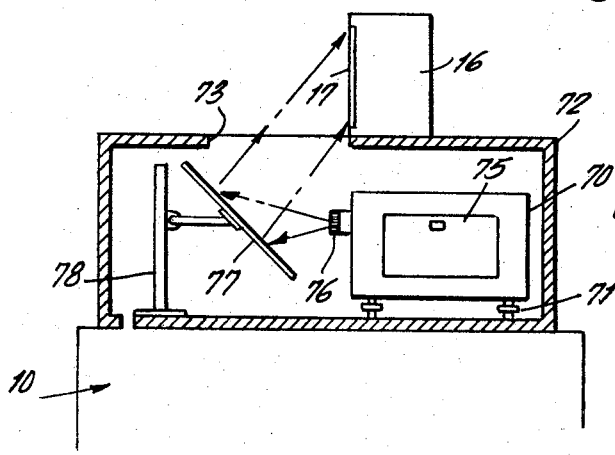
INVENTOR.
LAWRENCE P. LAVAN
By Bierman + Bierman
ATTORNEYS

MUSIC TEACHING MACHINE

The present invention relates to teaching machines and more particularly to a device for the visual presentation of musical instruction.

There has been, in recent years, increased interest in the utilization of machines in the teaching of students. Machines, compared to human teachers, are patient, free of adverse emotional involvement, and permit endless repetition. There have been various suggestions to apply the principles of teaching machines to the teaching of music. But these suggestions have usually involved complex and costly devices associated with a musical instrument and the special adaption of the instrument to the teaching device. In addition, those suggestions have generally not sought to teach one of the basic elements of harmony, namely, those pairs of notes constituting the major third and minor third. The major third is a chord consisting of two tones separated by four half-steps.

It is the objective of the present invention to present a musical teaching machine which is relatively simple and inexpensive and which teaches certain basic chords.

It is another objective of the present invention to present a musical teaching machine which presents an interesting and entertaining visual display when its associated musical instrument is being played.

In accordance with the present invention, a musical teaching machine includes a musical instrument having a plurality of keys. For example, the musical instrument may be a piano or organ having a conventional keyboard arrangement. The keys, or a segment of the keyboard, are operatively connected to electrical switching means. Each key operates a switch which makes, or breaks, a circuit to a lamp bulb. The bulbs are arranged, in a fixture, in two vertical rows, and are of different colors, in a particular arrangement. The bulb fixture is positioned directly behind a translucent screen. The student views the screen, which may be positioned, for example, on top of the piano or on an adjacent stand. Musical notations, particularly the bass and treble clefs and their associated bars which comprise the musical staff (each having five horizontal bars) may be printed on the transluscent screen. The bulbs are arranged in relationship to the bars so that a bulb appears in the same position in relationship to the bar on the translucent screen as its corresponding note would appear on a printed page of the music.

A movie projector is positioned adjacent the translucent screen. The image projected by the movie projector appears on the front of the screen and may be viewed by the student. Preferably the projector is arranged above or beneath the screen and projects through a lens system onto a mirror which reflects the image onto the front of the screen, the mirror being positioned above or beneath the screen and between the screen and the projector. The image is of a musical composition having the conventional clefs and bars and notes positioned as in conventional printed music text. The student plays the keyed musical instrument by watching the image of the music text on the screen. If his keying is correct, then there will be an immediately obvious visual correspondence between the bulb shining from behind the screen and the image of the note projected on the front of the screen. Similarly, if his keying is incorrect, there will be an obvious lack of such correspondence.

Other objectives of the present invention will be apparent from the preferred embodiment described in detail below, taken in conjunction with the drawings.

In the drawings:

FIG. 1 is a perspective view of the teaching machine of the present invention positioned on top of a piano with which it is associated;

FIG. 4 is an illustration of a portion of its conventional piano keyboard utilized to explain the musical program taught by the machine of the present invention and of its associated circuit;

FIG. 2A is an exemplary circuit for the light means;

FIG. 3 is a front perspective view of a portion of the bulb fixture utilized in the machine of the present invention; and FIG. 4 is a schematic view of the projection system of the machine of the present invention.

As illustrated in FIG. 1, the teaching machine of the present invention is utilized with a conventional piano. However, it should be understood that this teaching machine may be utilized with other keyboard instruments, such as an organ. The piano 10 has a cabinet 11 to which is attached a keyboard 12. The keyboard consists of a conventional number of white keys 13 and of black keys 14. The piano 10 may also include a stand 15 for positioning printed music. A screen frame 16 is positioned on top of the piano 10. The screen frame 16 is a separate instrument and preferably may be removed from the piano. The screen frame 16 frames a translucent screen 17. A treble clef 18 and its associated five bars 19a through 19e may be printed on the top portion of the screen 17. The bass clef 20, and similarly its five associated bars 20a through 20e are printed on the bottom portion of the screen. By "printing" is meant not only ink printing but other techniques such as engraving or silk screening.

A switching mechanism is positioned beneath each key of a selected portion of the keyboard. The keys which correspond to the treble and bass clefs on the translucent screen 17 would be those keys constituting approximately three octaves. For purposes of illustration, it is assumed that one of the octaves selected is that of middle C. The keys consequently, as illustrated in FIG. 1, each of which has a switch associated with it, would be the keys 21 through 30. The switching means may be, for example, a sensitive microswitch positioned beneath each of the keys. Alternatively, it may consist of a piezoelectric element connected to an electronic circuit. In any event, the depression of the key causes a closure of the switch. The switch closes a circuit which is connected to an electrical power source, for example, a battery or a low voltage DC source obtained from rectification of the conventional 110-volt AC of house current. Each key switch controls the circuit of a corresponding bulb. The depression of the key and the closing of the switch causes the bulb to light. The bulbs, as shown in FIG. 3, are held in a fixture 40. The fixture 40, which may be, for example, a metal or plastic block having a plurality of holes, has sixteen bulb positions on its face to show each octave. The bulbs are arranged in a first vertical row consisting of bulbs 41 through 48 and a second vertical row consisting of bulbs 51 through 58. The bulbs are grouped into two colors, the colors of which are different. The colors of one group, for example, white, are illustrated by circles, and the colors of the second group, for example, red, are illustrated by darkened circles. As shown, the bulbs which are of the second group are the bulbs 41, 42 and 43 (representing keys C-sharp, D-sharp and E-flat) and the bulbs 54, 55 and 56, 57 (representing keys F, G, A and B). The remaining bulbs in both rows are in the first group, i.e., they are the white bulbs. The first vertical row, of bulbs 41 through 48, is electrically connected to the switches of the black keys 14 of the keyboard. The second vertical row, bulbs 51 through 58, is connected to the white keys 13 of the keyboard.

The relationship between bulbs and the keyboard is shown in FIG. 2. In FIG. 2 two octaves are separated only for the purpose of clarity of illustration. In one octave the white keys are connected to switches and in the other octave the black keys are connected to switches. In practice, both the white and black keys of each octave would be connected to switches.

Some of the bulbs representing black keys, bulbs 42 and 43 (representing D-sharp and E-flat respectively) are connected to a single-pole double-throw switch 66. A similar switch is provided for bulbs representing the black keys A-sharp and B-flat (bulbs 47 and 46).

The current source is not shown in FIG. 2 for the purpose of clarity of illustration. Each of the switches 64 is in series with a source of current 65 and a bulb (light means), as shown in FIG. 2A. The selected octave has all the keys, both black and white, connected to switches and bulbs. In FIG. 2 the white keys C—C are shown as connected to bulbs 51—58 and black keys C-sharp, D-sharp, E-flat, F-sharp, G-sharp, and A- sharp/B-flat are shown as connected to bulbs 41—48. But in the preferred device the black and white keys are of the same octave connected to the bulbs 41—58.

The projection system is shown in FIG. 4. It consists of a movie projector 70 having adjustable legs 71. The projector 70 is in an enclosure 72 having a top opening 73. The enclosure 72 is adapted to rest on top of a piano or organ. The projector 70 is loaded with film; for example, the film may be on a cassette and loaded through door 75. The film is of a musical composition and is a mirror image of the conventional film strip. The lens system 76 of the projector throws an image on mirror 77 which is on adjustable stand 78. The image from mirror 77 is projected on screen 17, as previously described. The image may include horizontal bars and other musical indicia, if it is desired that those bars or indicia be projected along with the notes.

The present invention is also adapted for the teaching of voice or musical instruments, such as the violin, which are not keyboard instruments. A frequency analyzer has an input transducer to convert the musical tones to an electrical frequency band. The analyzer-discriminator produces an output at each frequency of the band. The output at each frequency of the analyzer operates a corresponding bulb of the bulbs, described above, to provide an indication of the music being played, which may be compared to the projected image.

I claim:

1. A system for the teaching of music, including a plurality of electrical switches adapted to be associated with and closed by the depression of keys of a musical instrument, circuit means connecting the switches in a series with an electrical source, a plurality of light means connected to the switches, a screen for viewing said light means, means for indicating the musical staff on said screen, each light means individually becoming illuminated by the closing of its respective switch, wherein said light means are placed in a predetermined position with respect to said musical staff such that when a particular key is depressed, the light means corresponding to such key appears in the proper position on said screen in relation to said staff, said light means being grouped into two colors with the first group of one color and the second group of a different color, one of said groups being connected to switches associated with those keys which when played together and located a third apart form a major third, a projector associated with said screen adapted for projecting musical notes on said screen such that there is a superposition of the projected notes with said light means when the light means are actuated whereby it is immediately apparent whether the proper keys have been depressed.

2. A system as in claim 1 wherein said projector is offset from said screen and further comprising a lens system associated with said projector for projecting an image on the said screen.

3. A system as in claim 2 wherein a mirror is positioned between the lens system and the screen.

4. A system as in claim 1 wherein the light means are arranged in two vertical rows in a fixture positioned behind the screen.

5. A system as in claim 1 adapted for a piano in which the first row is connected to switches of the black keys and the second row is connected to switches of the white keys.

6. The system as in claim 1 wherein said light means are positioned adjacent said screen.

7. A system as in claim 1 wherein said means for indicating the musical staff includes printing said staff directly on said screen.